(12) United States Patent
Lin

(10) Patent No.: US 7,134,359 B2
(45) Date of Patent: Nov. 14, 2006

(54) ADJUSTABLE HANDLE ASSEMBLY FOR A PERSONAL MOBILITY VEHICLE

(75) Inventor: Samuel Lin, Chiayi (TW)

(73) Assignee: Sunpex Technology Co., Ltd. (TW)

( * ) Notice: Subject to any disclaimer, the term of this patent is extended or adjusted under 35 U.S.C. 154(b) by 665 days.

(21) Appl. No.: 10/668,325

(22) Filed: Sep. 24, 2003

(65) Prior Publication Data

US 2005/0061103 A1 Mar. 24, 2005

(51) Int. Cl.
*B62K 21/16* (2006.01)

(52) U.S. Cl. ...................... 74/551.3; 280/775

(58) Field of Classification Search .............. 74/493, 74/551.1, 551.2, 551.3, 551.4, 551.5, 551.7; 280/278, 279, 287, 775
See application file for complete search history.

(56) References Cited

U.S. PATENT DOCUMENTS

| | | | | |
|---|---|---|---|---|
| 4,114,471 A | * | 9/1978 | White ...................... 74/551.6 |
| 4,756,700 A | * | 7/1988 | Coleman ................... 441/65 |
| 5,253,544 A | * | 10/1993 | Allsop et al. ............. 74/551.1 |
| 5,467,665 A | * | 11/1995 | Huang ...................... 74/551.2 |
| 5,816,614 A | * | 10/1998 | Kramer et al. ............ 280/775 |
| 6,176,337 B1 | * | 1/2001 | McConnell et al. ....... 180/208 |
| 6,474,689 B1 | * | 11/2002 | Mulhern et al. ........... 280/775 |
| 6,776,429 B1 | * | 8/2004 | Chou ........................ 280/279 |
| 6,845,997 B1 | * | 1/2005 | Chou ........................ 280/278 |
| 6,973,853 B1 | * | 12/2005 | Chang ...................... 74/551.3 |
| 7,040,192 B1 | * | 5/2006 | Chou ........................ 74/551.3 |
| 2004/0239072 A1 | * | 12/2004 | Chou ........................ 280/287 |

* cited by examiner

*Primary Examiner*—Vicky A. Johnson
(74) *Attorney, Agent, or Firm*—Fei-Fei Chao; Andrews Kurth LLP

(57) ABSTRACT

An adjustable handle assembly for a personal mobility vehicle includes a mounting bracket, an adjusting device including a primary and secondary pivot post pivotally on the mounting bracket and a mechanical lock interconnecting the two pivot posts. The mechanical lock includes a stationary bracket mounted on the primary pivot post, a bushing bracket pivotally mounted in the stationary bracket, a connecting tube, locking wedges and a sliding block. The connecting tube is attached to the bushing bracket, is hollow for slidably receiving the secondary pivot post and has multiple wedge holes that respectively movably hold locking wedges. The sliding block is slidably mounted on the connecting tube and has a bottom annular bevel that presses the locking wedges to clamp the secondary pivot post in place when the sliding block is forced to a locked position.

7 Claims, 6 Drawing Sheets

ADJUSTABLE HANDLE ASSEMBLY FOR A PERSONAL MOBILITY VEHICLE

BACKGROUND OF THE INVENTION

1. Field of the Invention

The present invention relates to an adjustable handle assembly for a personal mobility vehicle, and more particularly to an adjustable handle assembly with a mechanical lock to hold a handle in position so that the handle assembly is convenient to use for elderly and handicapped people who use the mobility vehicle.

2. Description of Related Art

Personal mobility vehicles, such as electric vehicles, aid people who are handicapped or elderly in moving from one place to another. A personal mobility vehicle typically has a chassis with wheels, a handle mounted on the chassis and a seat mounted on the chassis on which an elderly or handicapped person sits. A person sitting on the mobility vehicle controls the direction in which the vehicle moves by turning the handle. However, people's sizes and shapes vary greatly and may affect their ability to turn the handle on the personal mobility vehicle because of the position and angle of the handle. For example, some people are tall and some people are short.

Therefore, the handle of the mobility vehicle is designed to be adjustable so the angular position of the handle can be changed to accommodate widely different people who are elderly or handicapped. However, a conventional adjustment assembly for the handle of a personal mobility vehicle is inconvenient to operate. The conventional handle has a lock to hold the handle in position after the handle has been adjusted but a mechanic may be required to adjust and lock the handle.

To overcome the shortcomings, the present invention provides an adjustable handle assembly for a personal mobility vehicle having a mechanical lock to mitigate or obviate the aforementioned problems.

SUMMARY OF THE INVENTION

The main objective of the invention is to provide an adjustable handle assembly for a personal mobility vehicle, which has a mechanical lock to hold a handle of the vehicle in position and is convenient and easy to use.

The mechanical lock uses locking wedges and a sliding block that has a bottom annular bevel to press the locking wedges to clamp a pivot post on the adjustable handle assembly. The bottom annular bevel abutting the locking wedges that clamp the adjustable pivot post on the adjustable handle assembly to lock the handle in an adjusted position.

Other objectives, advantages and novel features of the invention will become more apparent from the following detailed description when taken in conjunction with the accompanying drawings.

DETAILED DESCRIPTION OF PREFERRED EMBODIMENT

Figure 1:
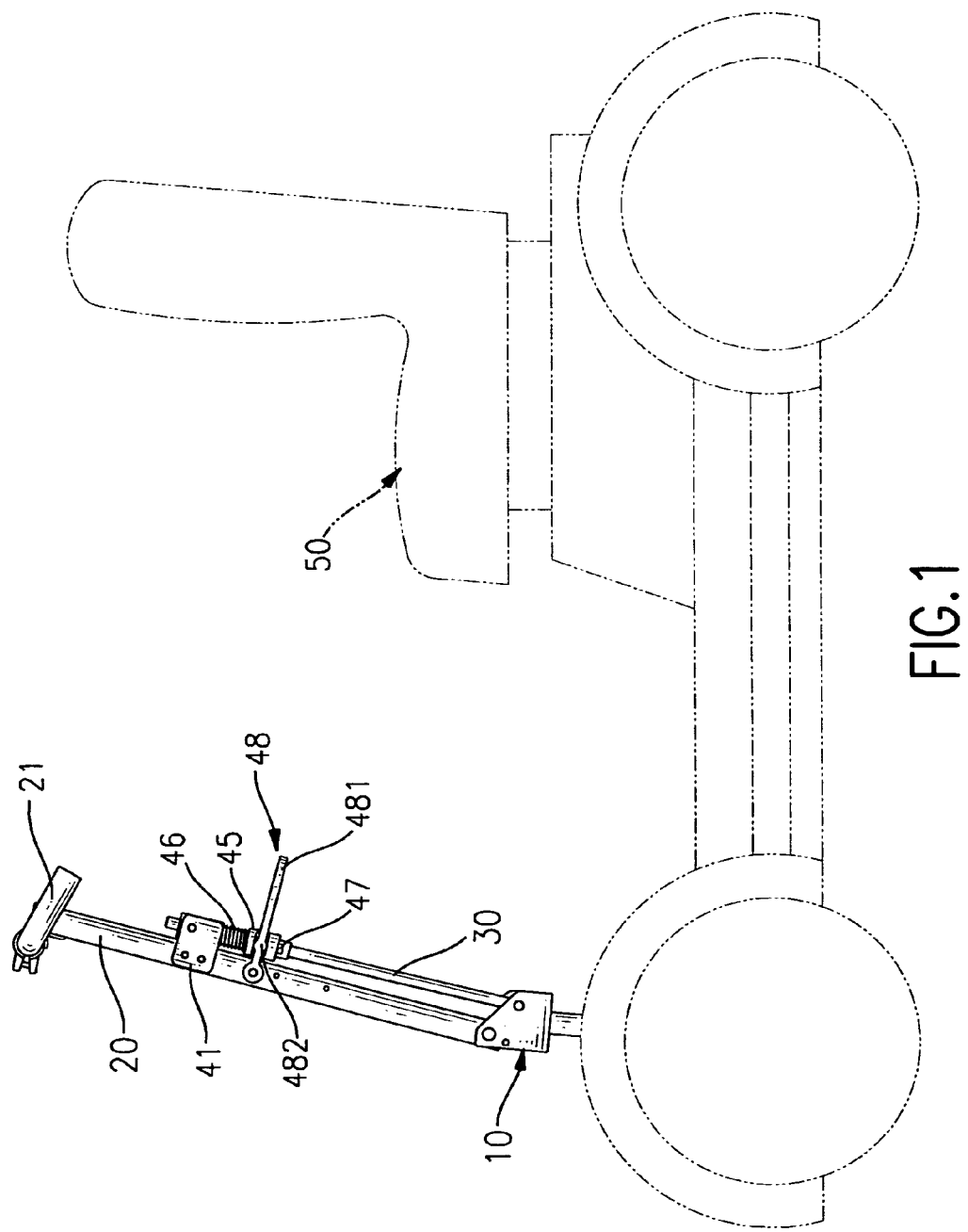
FIG. 1 is a side plan view of a personal mobility vehicle with an adjustable handle assembly in accordance with the present invention.
Figure 2:
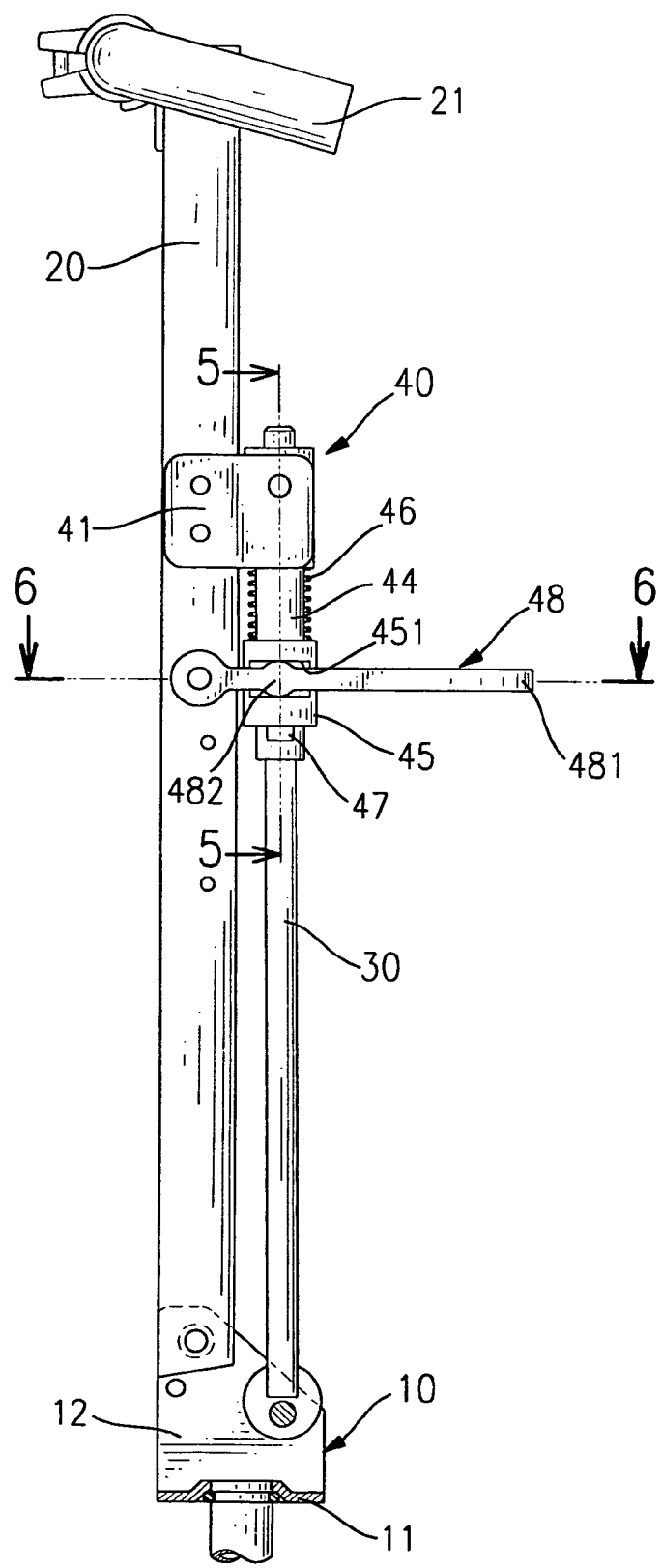
FIG. 2 is an enlarged side plan view of the adjustable handle assembly in FIG. 1.

With reference to FIGS. 1 and 2, a personal mobility vehicle (50) has a front chassis (not shown) on which two front wheels (not numbered) and an adjustable handle assembly (not numbered) in accordance with the present invention are mounted. The adjustable handle assembly is connected to the front wheels to allow a person sitting on the vehicle (50) to control the direction that the personal mobility vehicle (50) moves.

The adjustable handle assembly comprises a mounting bracket (10), an adjusting device (not numbered), a handle (21) and a mechanical lock (40). The mounting bracket (10) is attached to the front chassis, is substantially U-shaped and comprises a mounting base (11) and two perpendicular wings (12). The mounting base (11) is mounted on the front chassis of the vehicle (50). The wings (12) are formed perpendicular on and extend upward from the mounting base (11).

The adjusting device is pivotally mounted between the wings (12) of the mounting bracket (10) and comprises a primary pivot post (20) and a secondary pivot post (30). Each of the posts (20, 30) has a top end (not numbered) and a bottom end (not numbered). The bottom ends of the posts (20, 30) are mounted pivotally between the wings (12) of the mounting bracket (10). The handle (21) is attached to the top end of the primary pivot post (20) in a conventional manner to allow a person sitting on the vehicle (50) to control the direction the vehicle (50) moves.

Figure 5:
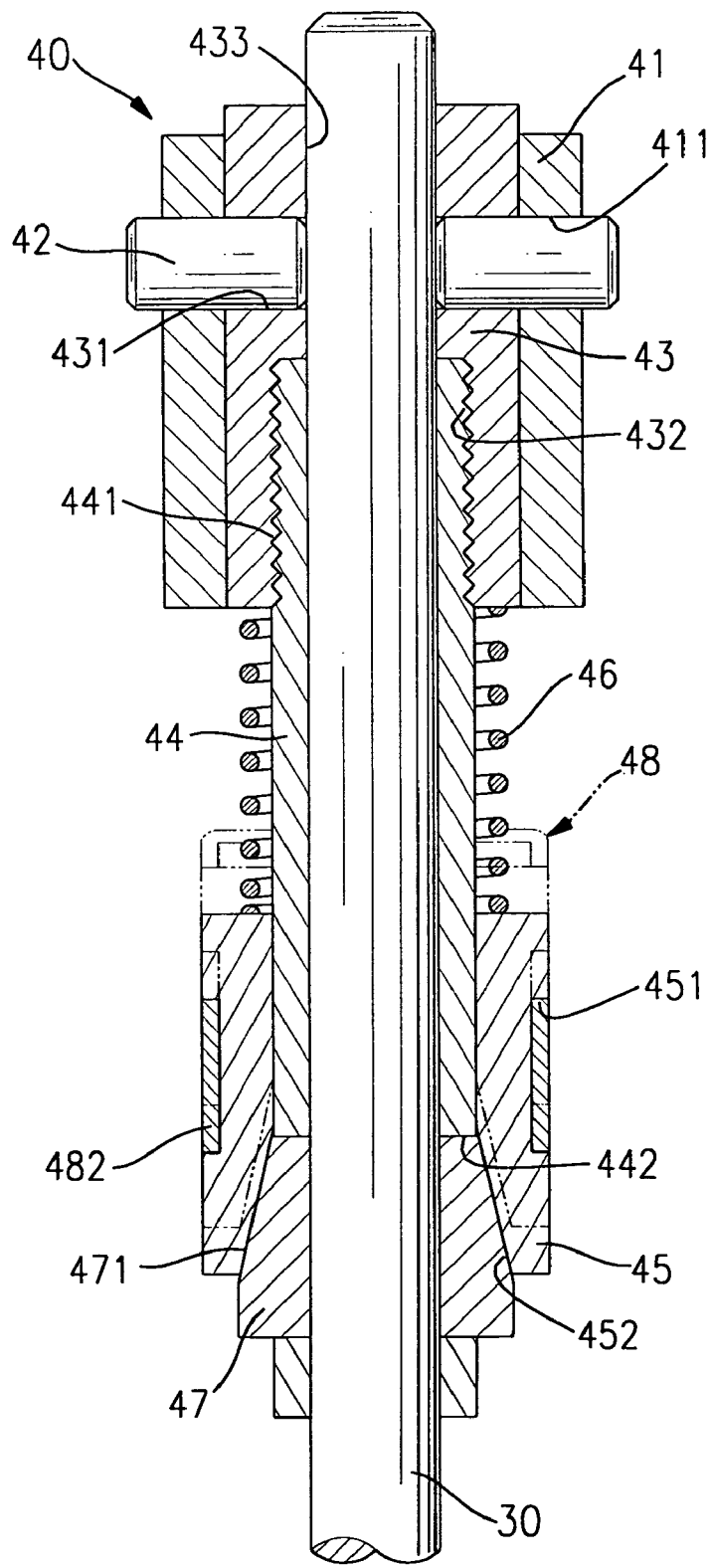
FIG. 5 is an enlarged front plan view in partial section of the adjustable handle assembly along line 5—5 in FIG. 2.
Figure 6:
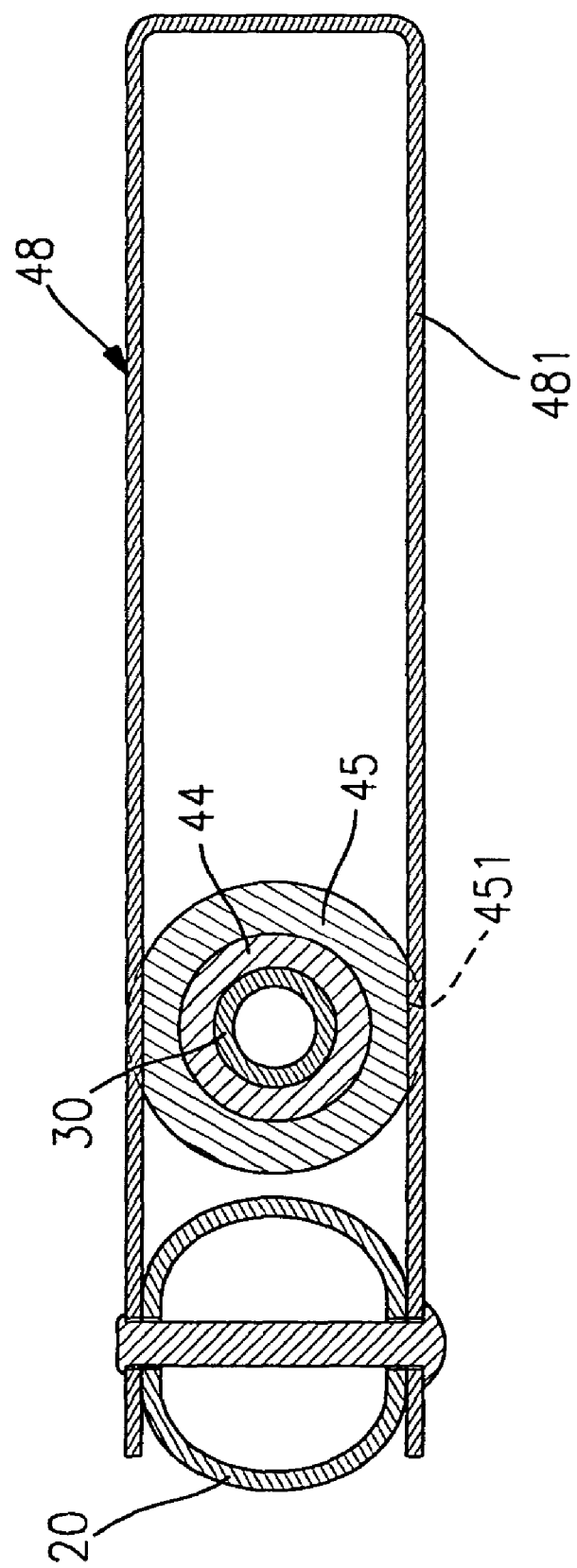
FIG. 6 is an enlarged cross sectional top plan view of the adjustable handle assembly along line 6—6 in FIG. 2.

With further reference to FIGS. 2, 5 and 6, the mechanical lock (40) interconnects the two posts (20, 30) to hold and lock the two posts (20, 30) in a locked position after the posts (20, 30) are adjusted. The mechanical lock (40) comprises a stationary bracket (41), two attachment pins (42), a bushing bracket (43), a connecting tube (44), a sliding block (45), a biasing member (46), two locking wedges (47) and a lever (48). The stationary bracket (41) is attached securely to and extends out from the primary pivot post (20) and comprises two mounting plates (not numbered). The mounting plates respectively have front ends (not numbered) and rear ends (not numbered). The front ends are attached to the primary pivot post (20) diametrically opposite to each other. The rear ends extend out parallel from the primary pivot post (20). Each rear end has a through hole (411) so the through holes (411) are aligned.

The bushing bracket (43) is mounted in the stationary bracket (41) between the rear ends of the mounting plates and has two pin holes (431), a bottom threaded hole (432) and a longitudinal passage (433). The two pin holes (431) aligned respectively with the through holes (411) in the mounting plates. The bottom threaded hole (432) and the longitudinal passage (433) are coaxially aligned and communicate with each other. The attachment pins (42) are inserted respectively into pairs of the aligned through holes (411) and the pin holes (431) to hold pivotally the bushing bracket (43) in place.

The connecting tube (44) connects to the bushing bracket (43) and has a top end (not numbered) with an exterior thread (441), a bottom end (not numbered), an outer periphery (not numbered) and two wedge holes (442). The exterior thread (441) screws into the bottom threaded hole (432) to attach the connecting tube (44) to the bushing bracket (43). The wedge holes (442) are defined in the outer periphery of the connecting tube (44) opposite to each other. The top end of the secondary pivot post (30) passes through the connecting tube (44), the longitudinal passage (433) of the bushing bracket (43) and extends out of the longitudinal passage (433) to mount slidably the secondary pivot post (30) in the connecting tube (44) and the bushing bracket (43).

The sliding block (45) is slidably mounted on the outer periphery of the connecting tube (44) over the wedge holes (442) and has two outer elongated sliding recesses (451) and a bottom annular bevel (452). The outer elongated sliding recesses (451) are formed opposite to each other to hold slidably the lever (48).

The basing member (46) such as a coil spring is mounted between the bushing bracket (43) and the sliding block (45) to provide a restitution force to the sliding block (45). After the lever (48) moves the sliding block (45) to an unlocked position and compresses the spring, the restitution force returns the sliding block (45) to a locked position when the lever (48) is released.

The locking wedges (47) are movably mounted respectively in the wedge holes (442) in the connecting tube (44) and each of the locking wedges (47) has a inclined surface (471) slidably abutting the bottom annular bevel (452) in the sliding block (45). When the sliding block (45) is in the locked position, the sliding block (45) pressed by the basing member (46) will press the locking wedges (47) into the wedge holes (442) to clamp the secondary pivot post (30). In such a state, the two posts (20, 30) are locked and will keep the angles of the posts (20, 30) from changing.

The lever (48) is pivotally mounted on the primary pivot post (20), is U-shaped and has two coupling arms (481). Each arm (481) is pivotally mounted on the primary pivot post (20) and has a pair of sliding lobes (482) that are slidably mounted in the outer elongated sliding recesses (451) in the sliding block (45).

Figure 3:
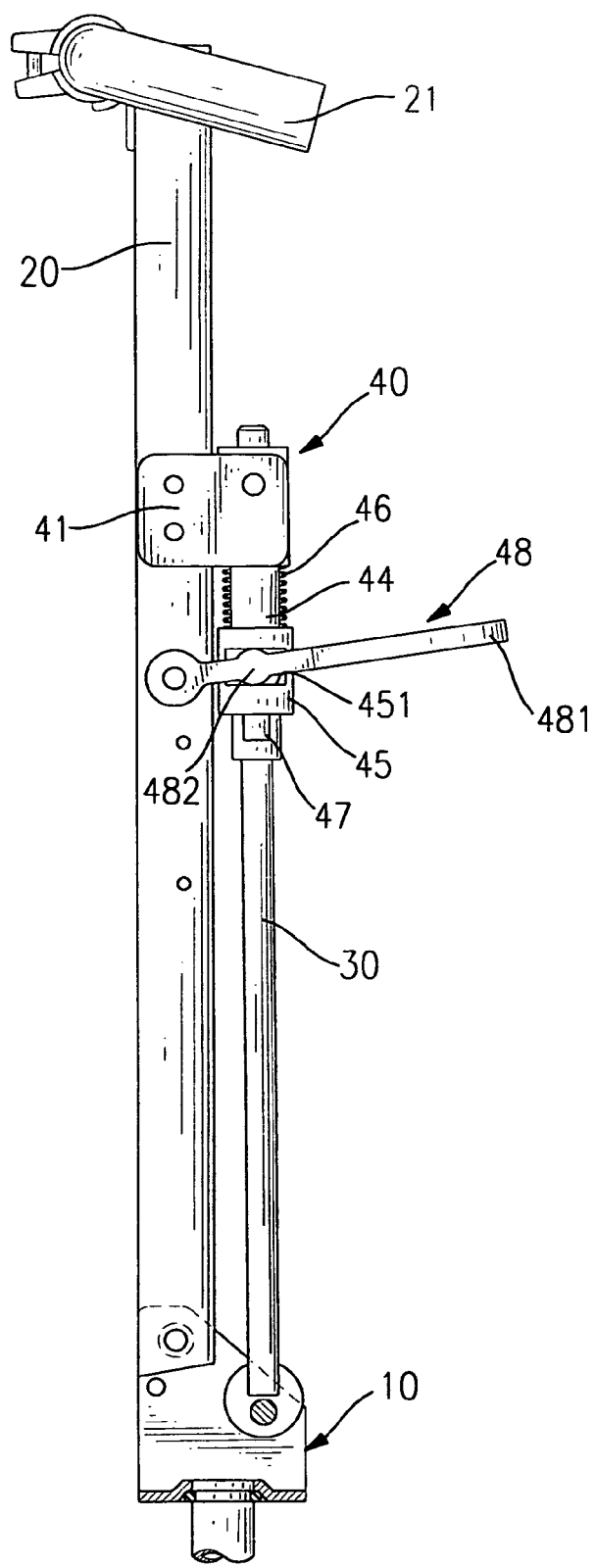
FIG. 3 is an operational enlarged side plan view of the adjustable handle assembly in FIG. 2 when a lever of the handle assembly is pivoted upward to unlock a mechanical lock on the handle assembly.

With reference to FIG. 3, the lever (48) is pivoted upward to move the sliding block (45) up to the unlocked position and simultaneously compress the basing member (46) and create the restitution force. The bottom annular bevel (452) of the sliding block (45) will separate from the inclined surfaces (471) on the locking wedges (47) that release the secondary pivot post (30). The two posts (20, 30) are adjustable to change the angels of the posts (20, 30) that will simultaneously change the angle of the handle (21) to accommodate a particular person's needs.

Figure 4:
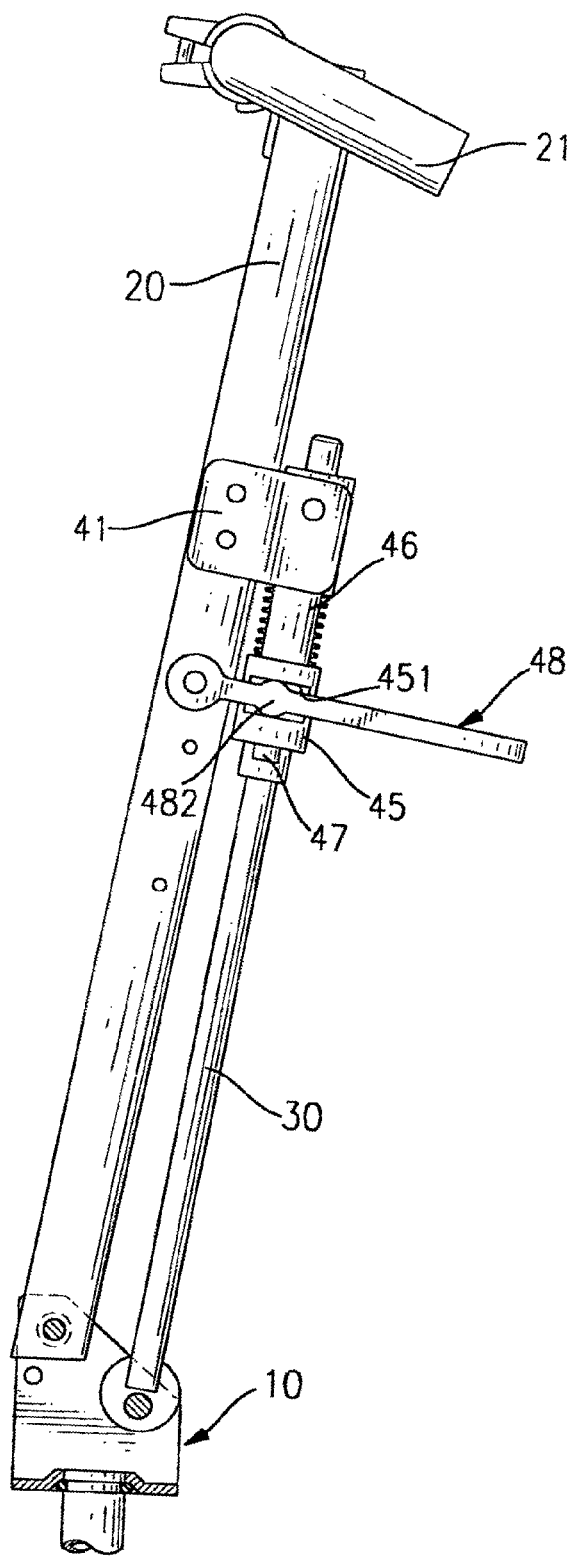
FIG. 4 is an enlarged side plan view of the adjustable handle assembly in FIG. 2 after the handle assembly is adjusted and the mechanical lock is locked.

With reference to FIG. 4, the lever (48) is released, the restitution force of the basing member (46) pushes the sliding block (45) back to the locked position, the sliding block (45) presses the locking wedges (47) against the secondary pivot post (30). The locking wedges (47) clamp the secondary pivot post (30) in position, again.

Consequently, simply pivoting the lever (48) and adjusting the angle of the handle (21) is labor saving and easy for elderly or handicapped people who are using the personal mobility vehicle (50).

Even though numerous characteristics and advantages of the present invention have been set forth in the foregoing description, together with details of the structure and function of the invention, the disclosure is illustrative only, and changes may be made in detail, especially in matters of shape, size, and arrangement of parts within the scope of the appended claims.

What is claimed is:

1. An adjustable handle assembly for a person mobility vehicle having a front chassis, and the adjustable handle assembly comprising:
   a mounting bracket adapted to be attached to the front chassis;
   an adjusting device including a primary pivot post and a secondary pivot post that have respectively a top end and a bottom end, and both the bottom ends pivotally attached to the mounting bracket;
   a handle mounted at the top end of the primary pivot post; and
   a mechanical lock interconnecting the primary and secondary pivot posts and comprising
      a stationary bracket mounted on the primary pivot post;
      a bushing bracket pivotally mounted in the stationary bracket;
      a connecting tube attached to the bushing bracket, being hollow for slidably receiving the top end of the secondary pivot post and having a top end and at least one wedge hole;
      a locking wedge movably mounted in each one of the at least one wedge hole and having an inclined surface exposed out of the respective one of the at least one wedge hole;
      a sliding block slidably mounted on the connecting tube over the at least one wedge hole and having a bottom annular bevel slidably abutting the inclined surface of the locking wedge;
      a basing member mounted between the bushing bracket and the sliding block to provide a restitution force to return the sliding block from an unlocked position to a locked position; and
      a lever pivotally mounted on the primary pivot post and coupled to the sliding block to move the sliding block toward the stationary bracket to the unlocked position;
   wherein the sliding block is forced by the basing member thereby the bottom annular bevel presses the inclined surface of the lock wedge to clamp the secondary pivot post when the sliding block is in the locked position and is moved toward the stationary bracket by pivoting the lever thereby the bottom annular bevel separates from the inclined surfaces of the locking wedge when the sliding block is in the unlocked position.

2. The adjustable handle assembly as claimed in claim 1, wherein
   the stationary bracket comprises two mounting plates that securely attached in parallel to the primary pivot post opposite to each other, each mounting plate has a through hole aligned with each other, the bushing bracket is mounted between the mounting plates and has two pin holes that are aligned respectively with the through holes in the mounting plates; and
   the mechanical lock further has two attachment pins inserted respectively into each pair of aligned through holes and pin holes to pivotally hold the bushing bracket in place.

3. The adjustable handle assembly as claimed in claim 2, wherein
   the sliding block further has two outer elongated sliding recesses; and the lever is U-shaped and has two coupling arms pivotally mounted on the primary pivot post, each coupling arm has a pair of sliding lobes that are slidably mounted in a respective one of the outer elongated sliding recesses of the sliding block.

4. The adjustable handle assembly as claimed in claim 2, wherein the bushing bracket further has a bottom threaded hole and a longitudinal passage that communicates with the bottom threaded hole; and the top end of the connecting tube has an exterior thread to screw into the bottom threaded hole;

wherein the top end of the secondary pivot post passes through the connecting tube, the longitudinal passage of the bushing bracket and extends out of the longitudinal passage.

5. The adjustable handle assembly as claimed in claim 4, wherein the sliding block further has two outer elongated sliding recesses; and the lever is U-shaped and has two coupling arms pivotally mounted on the primary pivot post, each coupling arm has a pair of sliding lobes that are slidably mounted in a respective one of the outer elongated sliding recesses of the sliding block.

6. The adjustable handle assembly as claimed in claim 5, wherein the mounting bracket comprises a mounting base adapted to be mounted on the front chassis and two perpendicular wings mounted perpendicularly on the mounting base to mounted pivotally the both bottom ends of the secondary pivot post.

7. The adjustable handle assembly as claimed in claim 1, wherein the sliding block further has two outer elongated sliding recesses; and the lever is U-shaped and has two coupling arms pivotally mounted on the primary pivot post, each coupling arm has a pair of sliding lobes that are slidably mounted in a respective one of the outer elongated sliding recesses of the sliding block.

* * * * *